US010937002B2

(12) United States Patent
Srinivasan et al.

(10) Patent No.: US 10,937,002 B2
(45) Date of Patent: Mar. 2, 2021

(54) SYSTEMS AND METHODS FOR ACCESSING CONFERENCE CALLS

(71) Applicant: VONAGE BUSINESS INC., Atlanta, GA (US)

(72) Inventors: Sanjay Srinivasan, Gilbert, AZ (US); Tanner Postert, Mesa, AZ (US); Larry Low, Scottsdale, AZ (US); Keith Croxford, Gilbert, AZ (US); Adam Baird, Peoria, AZ (US)

(73) Assignee: Vonage Business Inc., Atlanta, GA (US)

( * ) Notice: Subject to any disclaimer, the term of this patent is extended or adjusted under 35 U.S.C. 154(b) by 371 days.

(21) Appl. No.: 14/641,599

(22) Filed: Mar. 9, 2015

(65) Prior Publication Data

US 2016/0269561 A1    Sep. 15, 2016

(51) Int. Cl.
*G06Q 10/10* (2012.01)
*H04M 3/56* (2006.01)
*H04M 3/42* (2006.01)
*H04M 7/00* (2006.01)

(52) U.S. Cl.
CPC ........ *G06Q 10/1093* (2013.01); *H04M 3/565* (2013.01); *H04M 3/42059* (2013.01); *H04M 7/006* (2013.01); *H04M 2203/2072* (2013.01); *H04M 2203/5054* (2013.01)

(58) Field of Classification Search
USPC .................................................... 379/202.01
See application file for complete search history.

(56) References Cited

U.S. PATENT DOCUMENTS

| 6,760,423 | B1 | 7/2004 | Todd | |
| 6,850,609 | B1 * | 2/2005 | Schrage | H04M 3/42221 |
| | | | | 379/158 |
| 7,085,558 | B2 * | 8/2006 | Berstis | H04L 12/1831 |
| | | | | 455/416 |
| 8,600,027 | B1 | 12/2013 | Doerr et al. | |
| 8,730,847 | B1 | 5/2014 | Carino et al. | |
| 8,897,434 | B2 * | 11/2014 | Perry | H04M 3/56 |
| | | | | 379/202.01 |
| 9,112,995 | B2 * | 8/2015 | Banta | H04M 11/00 |

(Continued)

FOREIGN PATENT DOCUMENTS

WO    WO 01/35655 A2    5/2001

OTHER PUBLICATIONS

Jun. 16, 2016 International Search Report issued in International Application No. PCT/US2016/020576.

(Continued)

*Primary Examiner* — Amal S Zenati
(74) *Attorney, Agent, or Firm* — FisherBroyles, LLP; Joseph Pagnotta

(57) ABSTRACT

A service for automatically connecting an individual's telephony device to a conference call when the conference call is about to begin is provided by a telephony system. The telephony system obtains information about a scheduled conference call directly from the individual's electronic calendar. When it is time for the conference call to begin, the telephony system dials into the conference call bridge and automatically provides the information needed to access the conference call. The telephony system then connects the individual's telephony device to the conference call.

20 Claims, 7 Drawing Sheets

(56) References Cited

U.S. PATENT DOCUMENTS

| | | | | |
|---|---|---|---|---|
| 2003/0125954 A1* | 7/2003 | Bradley | ............ | H04M 3/42042 |
| | | | | 704/270 |
| 2003/0231746 A1* | 12/2003 | Hunter | .................... | H04M 3/56 |
| | | | | 379/88.01 |
| 2013/0058472 A1* | 3/2013 | de Jong | ................ | H04M 3/565 |
| | | | | 379/202.01 |
| 2014/0036733 A1 | 2/2014 | Teng et al. | | |

OTHER PUBLICATIONS

Jun. 16, 2016 Written Opinion issued in International Application No. PCT/US2016/020576.

* cited by examiner

SYSTEMS AND METHODS FOR ACCESSING CONFERENCE CALLS

BACKGROUND OF THE INVENTION

The invention is related to conference calling, and more specifically, to systems and methods for connecting a participant to a conference call.

In a typical situation, an individual that wishes to participate in a conference call must dial an access telephone number just before the conference call is to begin. Once connected to the conference call bridge, the individual is asked for an access code. The individual can provide the access code by dialing a series of digits on his telephone keypad, or possibly by speaking the access code. Assuming the access code is valid, the individual's telephone is then connected to the conference call.

Some known systems for connecting an individual to a conference call can be configured to place an outgoing telephone call from the conference call bridge to the individual's telephone. In some instances, as soon as the individual answers the call, he is connected to the conference call. In other instances, after answering the call the individual must provide an access code before being connected to the conference call. Regardless, such a system can be advantageous in that the individual need not remember when to dial into the conference call, and the individual need not place a call, or remember the access telephone number, in order to be connected to the conference call.

Unfortunately, in order for such a system to operate, it must be pre-configured with the telephone numbers of those individuals that are to participate in the conference call. In addition, the conference call bridge must have the capability to place outgoing telephone calls, potentially on a large number of telephone lines, to add individuals to the conference call. If the conference call bridge lacks this capability, it is still necessary for the individual to remember when to dial into the conference call, and the individual must also have the access code available once the individual has been connected to the conference call bridge.

Moreover, when an administrator or individual in charge of setting up the conference call must enter a list of telephone numbers so that the conference call bridge can dial out to participants, control rests with that administrator. An individual who wishes to participate in the conference call does not have control over whether he will be added to the list, and/or whether the conference call bridge will call to add the individual to the conference call.

What is needed is a system that automates the process of connecting an individual to a conference call, even when the conference call bridge itself lacks any ability to place outgoing telephone calls to participants to add them to the conference call. Also, even if the conference call bridge has this capability, it would be desirable to have an alternate way of automatically connecting an individual to a conference call to relieve an administrator of the burden of pre-configuring a list of participant telephone numbers, and for those instances where one or more individuals who wish to participate in a conference call are mistakenly not added to such a list of telephone numbers. Further, it would be desirable for an individual to have an independent way of causing his telephony device to be automatically connected to a conference call, which does not rely upon an administrator's actions.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
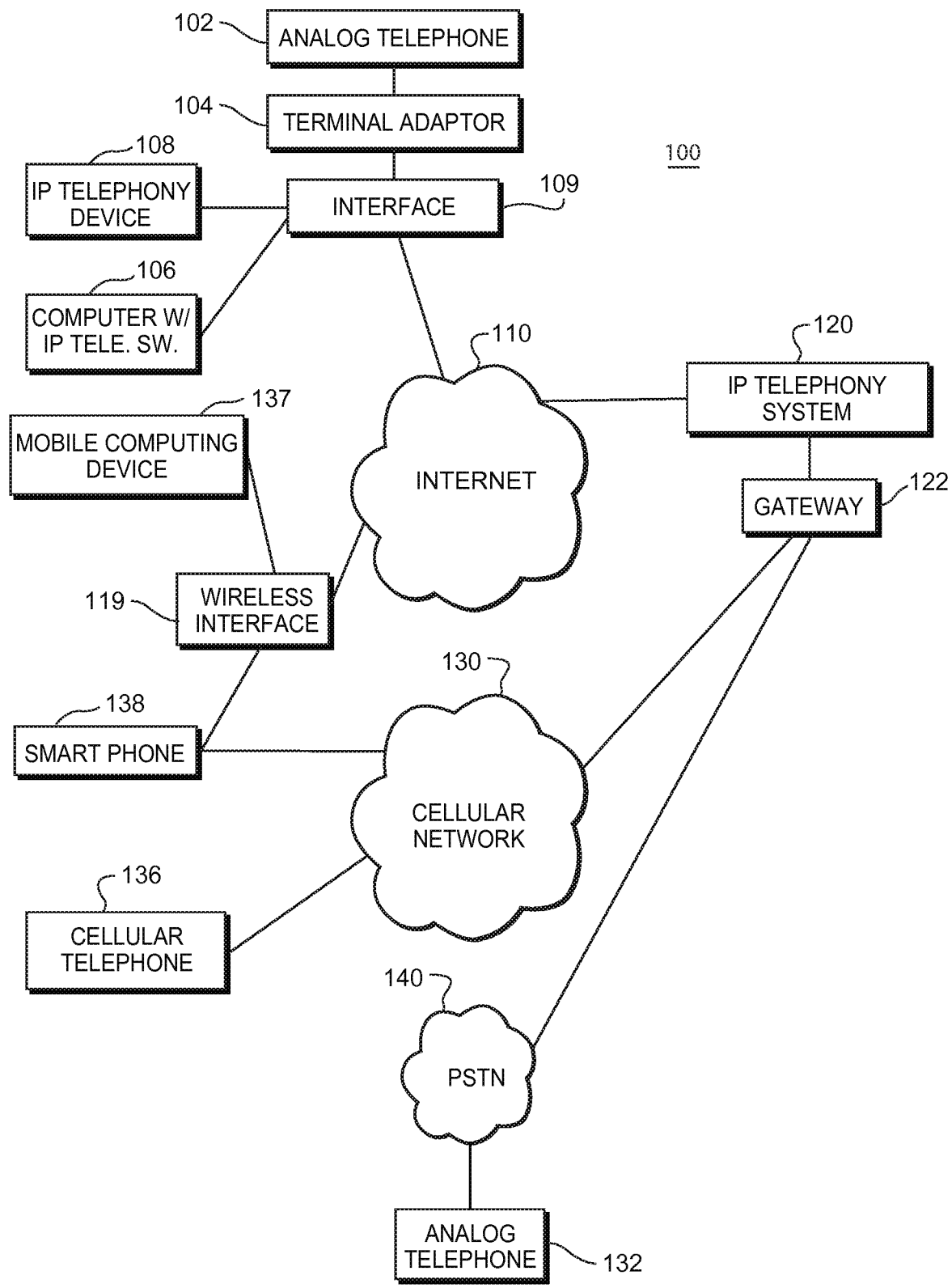
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

Figure 2:
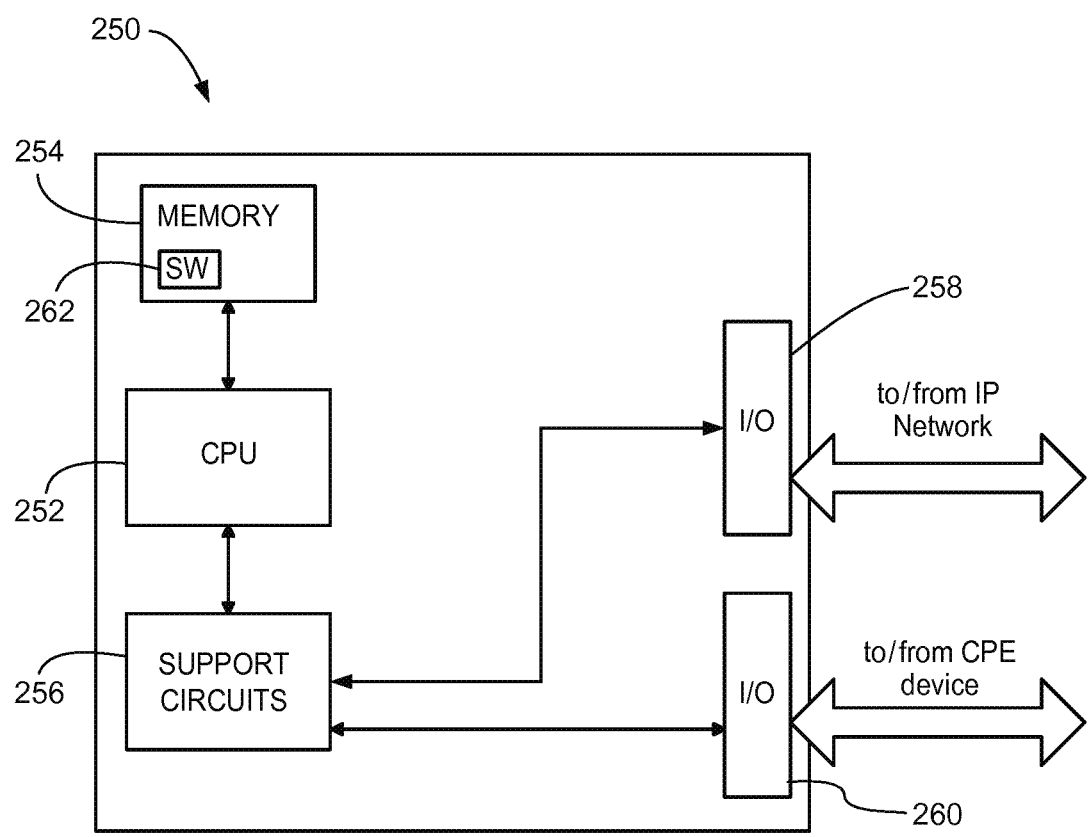
FIG. 2 is a diagram of various elements of a processor that forms part of an IP telephony system and/or part of a user's telephony device.

FIG. 2 illustrates elements of a computer processor 250 that can be used as part of the IP telephony system 120, or as part of a user's telephony device, to accomplish various functions. The IP telephony system 120 could include multiple processors 250 located at various locations in the system, along with their operating components and programming, each carrying out a specific or dedicated portion of the functions performed by the IP telephony system 120. Likewise, a user's telephony device could include one or more processors 250, along with their operating components and programming, each carrying out a specific or dedicated portion of the functions performed by the telephony device.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120 and/or a user's telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct or participate in an IP telephony communication. An IP telephony device could be an IP telephone, a computer running IP telephony software, a telephone adaptor which is connected to an analog telephone, or some other type of device capable of communicating via data packets. An IP telephony device could also be a cellular telephone, a smartphone, or a portable or tablet computing device that runs a software client that enables the device to act as an IP telephony device. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™ or an Apple iPad™, which includes a speaker and a microphone. A software application loaded onto an Apple iPad™ can be run so that the Apple iPad™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Systems and methods embodying the invention are capable of automatically connecting an individual to an audio or video conference call. Descriptions of various embodiment are provided below. In these descriptions, embodiments are implemented as part of an IP telephony system. Also, these embodiments are configured to automatically connect an individual's telephony device to an audio conference call. These descriptions of various embodiments should in no way be considered limiting. Embodiments could be implemented using other types of telephony systems, and embodiments could be implemented to connect an individual to a video conference, as opposed to an audio conference call.

In systems and methods embodying the invention, information about scheduled audio conference calls or video conferences are extracted from an individual's electronic calendar, and this information is used to automatically connect the individual to a scheduled conference when it is time for the conference to begin. The information in an individual's electronic calendar may include information about appointments, deadlines, and scheduled audio and/or video conferences. An individual could have only a single electronic calendar that is associated with the individual's work, or an individual could have multiple electronic calendars, where one is associated with work related events, and where other electronic calendars are associated with the individual's home or private events.

Information in an electronic calendar relating to a scheduled audio conference call could include the access telephone number that is to be dialed to connect to a conference call bridge, as well as an access code that must be provided once one has connected to the conference call bridge. Many widely used conference call bridges make it possible for the person setting up a conference call to easily send electronic invitations to participants via email. Each participant can then accept such an electronic invitation to easily add information about the conference call to their electronic calendar. Because of the way this information is recorded into an individual's electronic calendar, the information is recorded in a known, structured format. Moreover, the access telephone numbers that are used to access widely used conference call bridges are well known. Both of these factors can make it easy to locate information relating to a scheduled conference call in an individual's electronic calendar. Information in the electronic calendar may also include the topic or subject of the call, the organizer, and information about other potential participants.

Information in an electronic calendar relating to a video conference can also be recorded in the electronic calendar in much the same way as information relating to an audio conference. Such information could include an Internet IP address or URL to which the individual can connect with a web browser in order to access the video conference. This information could also include access codes and other electronic credentials that are required to join the video conference. Here again, because the information may be stored in a known, structured fashion, and because the IP addresses and/or URL's of widely used video conference systems are known, it can be easy to locate information in an individual's electronic calendar that relates to a scheduled video conference.

Figure 3:
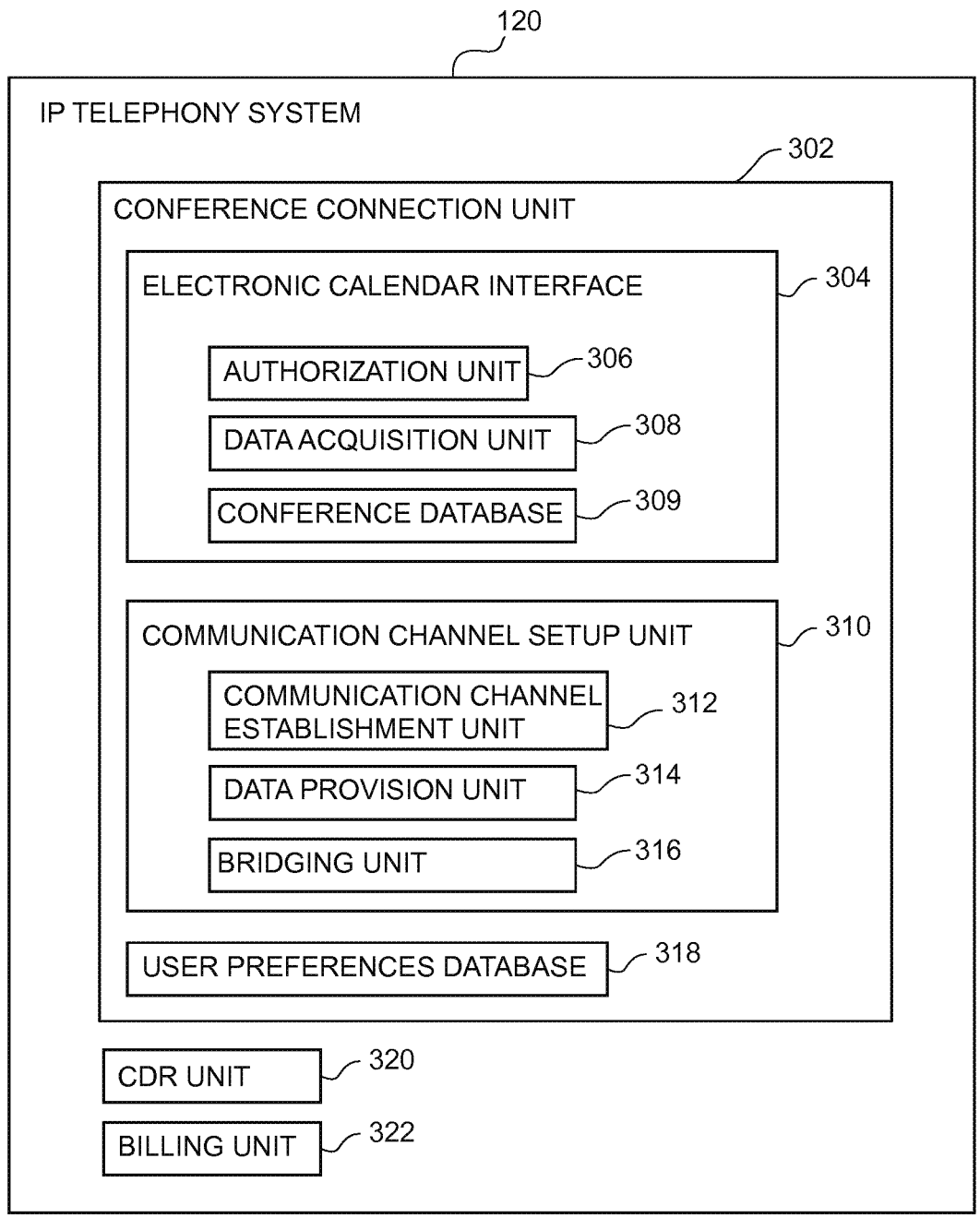
FIG. 3 is a block diagram illustrating selected elements of an IP telephony system embodying the invention.

FIG. 3 illustrates selected elements of an IP telephony system 120. The IP telephony system 120 includes a conference connection unit 302, which is configured to automatically connect an individual to an audio conference call or to a video conference. Features of the conference connection unit 302 are discussed in detail below, along with the methods performed by the conference connection unit 302.

The conference connection unit 302 includes an electronic calendar interface 304 that is configured to obtain information from individuals' electronic calendars in an automated fashion. The electronic calendar interface 304 includes an authorization unit 306 that is configured to obtain or provide authorizations that are necessary for a data acquisition unit 308 to obtain information from an individual's electronic calendar in an automated fashion, without user intervention or participation.

Typically, an individual is only able to access one of their electronic calendars by providing a user name and password. This prevents third parties from improperly accessing the information in an individual's electronic calendar and/or from improperly changing, adding or deleting information in the individual's electronic calendar. However, it is also common for an individual to grant a third party with read only access to their electronic calendar. In some instances, an individual might also grant a third party the ability to add, delete or modify information in the individual's electronic calendar.

When an individual first signs up for a service that will automatically connect the individual to audio and/or video conferences, the individual would take steps to authorize the electronic calendar interface 304 to access and obtain information stored in the individual's electronic calendar. This could include providing user name and password information to the authorization unit 306, which would allow the data acquisition unit 308 to access information in the individual's electronic calendar.

Authorizing access might also be accomplished in much the same way that the individual would authorize a third party to access the individual's electronic calendar. In some embodiments, it may be necessary to change settings within the individual's electronic calendar so that the data acquisition unit 308 can obtain access to the information in individual's electronic calendar.

In some instances, and depending on the electronic calendar, the data acquisition unit 308 may periodically review the information in an individual's electronic calendar to determine if any new audio or video conferences have been recorded in the electronic calendar. If so, information about the audio/video conference may be recorded in a conference database 309 that is maintained by the electronic calendar interface 304.

In alternate embodiments, it may be possible to configure the individual's electronic calendar to send information to the data acquisition unit 308. For example, it may be possible to configure the individual's electronic calendar to periodically upload all information in the electronic calendar to the data acquisition unit 308, or perhaps only information that has been added, deleted or changed since the last download occurred. In other instances, the individual's electronic calendar may be configured to only upload information about upcoming audio or video conferences. In still other instances, each time that a new event is added to the individual's electronic calendar, a copy of that information could be sent to the data acquisition unit 308. In still other instances, only information about audio and video conferences may be forwarded to the data acquisition unit 308 when that information is first added to the electronic calendar.

The information that is acquired from an individual's electronic calendar could be parsed and saved in various ways, as would be apparent to one of ordinary skill in the art. For example, the acquired information could be parsed based on key words such as "access number" and "access code," and also by recognizing digit patterns as telephone numbers. If keywords specifying a vendor or service provider are present, such as "WebEx™," parsing could be accomplished based on how that vendor or service provider typically arranges information about an audio or video conference.

The conference connection unit 302 also includes a communication channel setup unit 310, which is responsible for connecting an individual to an audio conference call or a video conference when the conference is about to being. The communication channel setup unit 310 includes a communication channel establishment unit 312 that is responsible for setting up a media link to the conference. In the case of an audio conference call, the communication channel establishment unit 312 would place a first telephone call to one of the individual's telephony devices, and, and a second telephone call to the conference call bridge. The bridging unit 316 would then bridge the first and second telephone calls to connect the individual's telephony device to the conference call bridge.

In the case of a video conference, the communication channel establishment unit 312 would connect an individual's audio/video interface to the video conference system via a data connection. The individual's audio/video interface could be dedicated video conferencing equipment, it could be part of a desktop or laptop computer, it could be a smartphone, or it could be any number of other elements that combined give the individual audio and video capabilities.

As will be explained in greater detail below, a data provision unit 314 of the communication channel setup unit 310 is configured to interact with a conference call bridge or a video conference system to provide information, access codes, data or other credentials that are necessary for the individual to join an audio conference call or a video conference. This information would be obtained from the individual's electronic calendar by the data acquisition unit 308 and it would be stored in the conference database 309. Thus, the data provision unit 314 would use information in the conference database 309 to gain access to a scheduled audio conference call or video conference on behalf of the individual in an automated fashion, as will be explained below.

The conference connection unit 302 also includes a user preferences database 318. Any number of different preferences that control or affect how the conference connection unit 302 operates for a given individual could be stored in the user preferences database 318. An individual could set certain preferences when first signing up for an automated connection service. An individual could also add preferences, or change them, at any time.

For example, an individual could specify that he is to be automatically connected to an audio conference call bridge at the exact time that the conference call is scheduled to begin. Alternatively, the individual could specify that he is to be connected a certain number of minutes before or after the scheduled start time.

The user preferences database 318 might also include information about which of the individual's telephony devices are to be automatically connected to an audio conference call. For example, this information could specify that during the hours of 9 am to 5 pm on weekdays, the individual's work telephone is to be automatically connected to any scheduled audio conference calls. This information would further specify that at other times, the individual's cellular telephone is to be connected to any scheduled audio conference calls. Thus, preferences about which telephony devices are to be connected could be time-of-day and day-of-the-week dependent. Preferences may also include simultaneous ringing of multiple telephony devices, or the sequential ringing of two or more telephony devices. The same sorts of preferences could be stored in the user preferences database 318 to indicate which of the individual's video interfaces is to be automatically connected to scheduled video conferences.

User preferences might also be based on an identity of the audio conference call or video conference to which the individual is being automatically connected. For example, the individual might specify that all audio conference calls that are setup through a first conference call bridge are to be automatically connected to a first telephony device, and that all audio conference calls setup through a second conference call bridge are to be connected to a second telephony device.

The user preferences database 318 might also specify when the auto connection service is to be active. For example, an individual could specify that the auto connection service is to be active for all conferences scheduled between 9 am and 5 pm on weekdays, but it is to be inactive at all other times. If the system is able to obtain information about the location of an individual's telephony device, such as a GPS enabled smartphone, the user preferences could also be location dependent.

The user preferences database 318 might also include information about whether an individual is to be provided with reminders of upcoming conferences, and if so, when the reminders are to be provided. In some embodiments, a reminder of an upcoming conference could also query the individual about whether the individual wishes to be automatically connected to the conference when it is about to begin. If so, the automated connection process would occur. If not, the individual would have to follow normal manual procedures to connect to the conference.

The user preferences database 318 might also contain information about what to do if an individual fails to answer an automated connection attempt. For example, if the conference is an audio conference call, and the system attempts to connect the individual to the audio conference call by placing a telephone call to a first of the individual's telephony devices, the individual's preferences may specify that if the individual does not answer that telephone call, the system is to make a second attempt to connect the individual by placing a second telephone call to a second of the individual's telephony devices.

As illustrated in FIG. 3, the IP telephony system 120 also includes a call detail record (CDR) unit 320 that stores call detail records that are created for telephony communications handled by the IP telephony system 120. A billing unit 322 then generates bills based on the information stored in the CDRs. An IP telephony system 120 would have additional elements not shown in FIG. 3. Likewise, the conference connection unit 302 could have additional elements that are not shown in FIG. 3. Also, an IP telephony system 120, and a conference connection unit 302, could have fewer than all of the elements illustrated in FIG. 3. Thus, the depiction provided in FIG. 3 should in no way be considered limiting.

Figure 4:
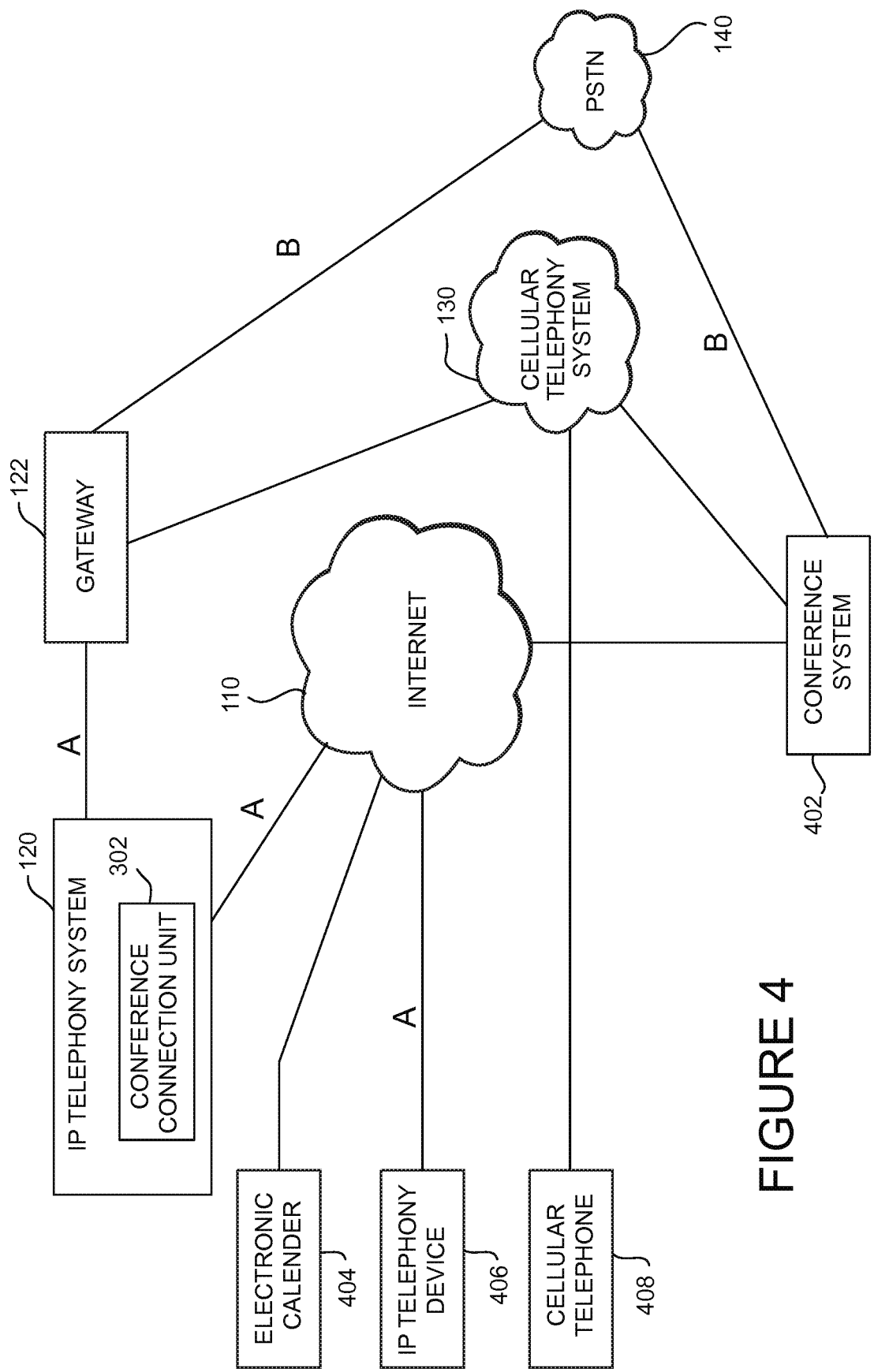
FIG. 4 is a block diagram illustrating a communications environment that is used to explain how an individual can be automatically connected to a scheduled conference call.

FIG. 4 illustrates elements of a communications environment 400 that will be used to help explain how systems and methods embodying the invention operate. As shown therein, an IP telephony system 120 like the one described above in connection with FIG. 3 includes a conference connection unit 302. The IP telephony system 120 is capable of setting up communications channels via the Internet 110, via a cellular telephony system 130, and via a PSTN 140. A conferencing system 402 is capable of setting and and/or hosting conferences. The conferences could be audio conference calls or video conferences. For purposes of the following explanation, we will assume that the conferencing system 402 is configured to provide audio conference calling services. FIG. 4 also illustrates that an individual has an electronic calendar 404, an IP telephony device 406 and a cellular telephone 408.

Methods embodying the invention will now be described with references to the flowcharts in FIGS. 5-7, with references to the communications environment 400 illustrated in FIG. 4, and with references to the conference connection unit 302 illustrated in FIG. 3.

Figure 5:
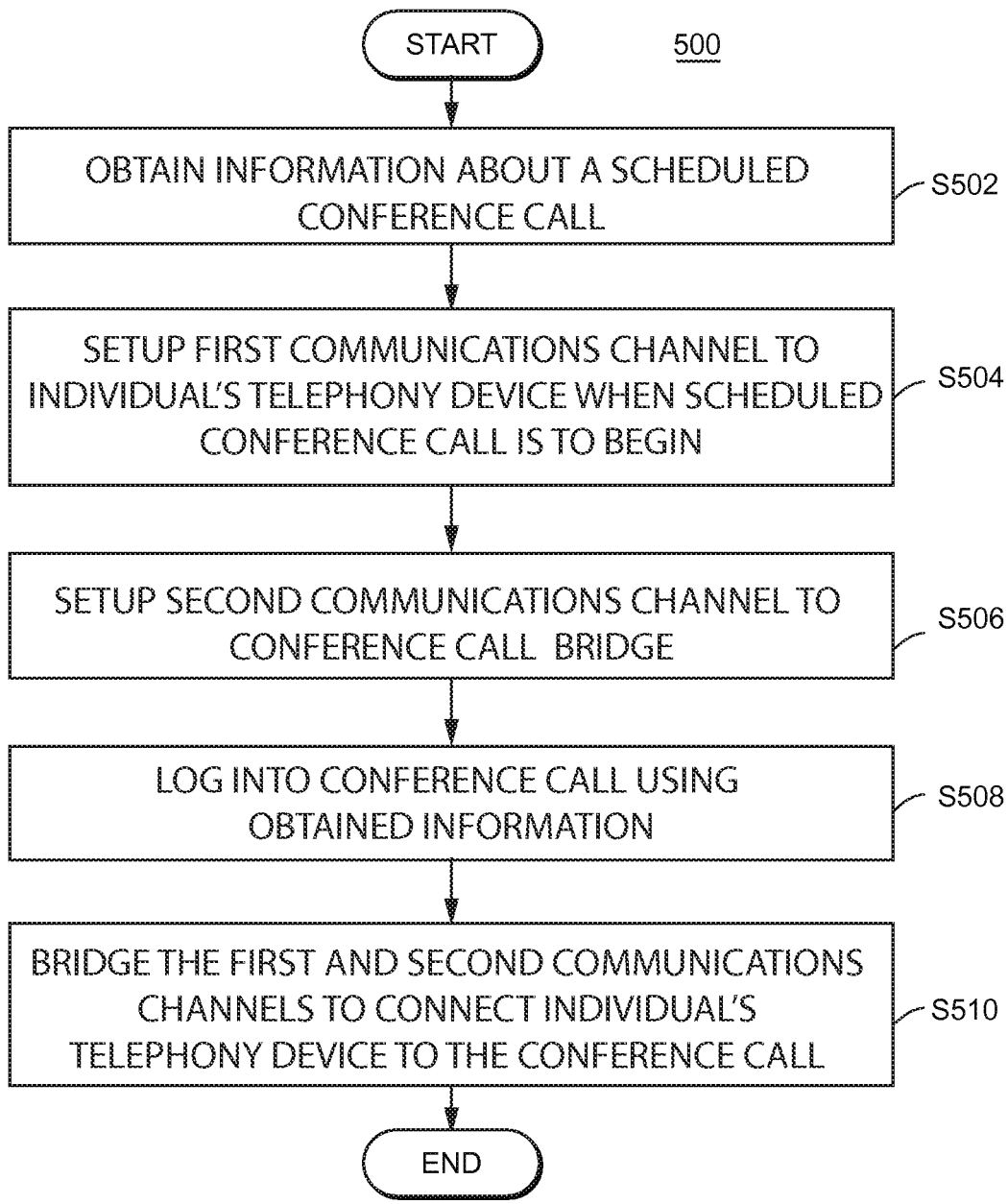
FIG. 5 is a flow diagram illustrating steps of a method performed by elements of an IP telephony system to automatically connect an individual's telephony device to a scheduled conference call.

FIG. 5 illustrates a method 500 of connecting an individual to an audio conference call in an automated fashion which is performed by elements of a conference connection unit 302. The method begins and proceeds to step S502, where a data acquisition unit 308 obtains information about a scheduled conference call from a first individual's electronic calendar 404. This information is then stored in the conference database 309. As explained above, the information could be obtained when the data acquisition unit 308 performs a periodic review of information in the individual's electronic calendar 404. Alternatively, this information could be obtained because the individual's electronic calendar 404 sent the information to the data acquisition unit 308.

When the time for the scheduled conference call approaches, in step S504, the communication channel establishment unit 312 sets up a first communication channel to one of the individual's telephony devices. For example, the first communications channel could be established by placing an outgoing telephone call to the first individual's IP telephony device 406. In alternate embodiments, the first communications channel A could be setup as a data link between the communication channel establishment unit 312 and a software application running on one of the first individual's telephony devices, or in some other way. In this example, and as illustrated in FIG. 4, the first communications channel A would run from the IP telephony system 120 to the first individual's IP telephony device 406 via the Internet 110.

Next, in step S506, the communication channel establishment unit 312 places an outgoing telephone call to an access telephone number of the conference system 402 to access the conference call bridge for the scheduled conference call. This access telephone number is part of the information relating to the scheduled conference call that was obtained from the individual's electronic calendar 404. When this call is connected, it establishes a second communications channel between the conference connection unit 302 and the conference call bridge provided by the conference system 402. As depicted in FIG. 4, this second communications channel, labeled B, passes from the IP telephony system 120 to the gateway 122, then to the PSTN 140, then on to the conference system 402.

In step S508, the data provision unit 314 provides the conference call bridge with any access information required by the conference call bridge to access the scheduled conference call. This could include an access code that is part of the information obtained from the individual's electronic calendar 404.

Figure 6:
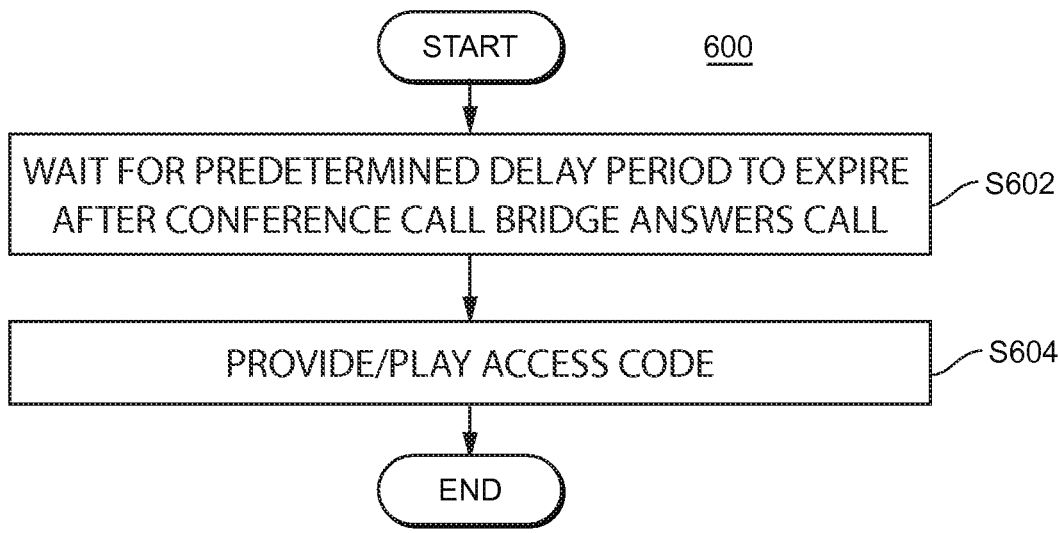
FIG. 6 is a flow diagram illustrating steps of a first method performed by elements of an IP telephony system to access a conference call using information obtained from an individual's electronic calendar.

FIG. 6 illustrates a method that could be performed as step S508 of the method illustrated in FIG. 5. The method would begin when the telephone call placed to the conference call bridge is answered by the conference system 402. As shown in FIG. 6, the method then proceeds to step S602, where a predetermined delay period is allowed to expire. This delay is intended to elapse while the conference call bridge plays an audio recording that asks the calling party to enter an access code. The predetermined delay period that is allowed to elapse in step S602 could vary depending on the configuration of the conferencing call bridge.

Next, in step S604, the data provision unit 314 provides the access code obtained from the individual's electronic calendar 404 and which is needed to access the scheduled conference call. The provision of the access code could include the data provision unit 314 playing the DTMF tones that correspond to the digits of an access code. Of course, the access code could also be provided to the conference calling bridge in other ways. For example, if the data provision unit 314 is providing information to a video conference system, providing the information could include sending data to the video conference system via a data network. The method would then end, which essentially means proceeding to step S510 of the method illustrated in FIG. 5.

In the method described above in connection with FIG. 6, a predetermined delay period is allowed to expire after the call is connected to the conference call bridge to allow time for the conference call bridge to play a recording asking for the input of an access code. In alternate embodiments, this same basic process could be accomplished in different ways. For example, instead of waiting for a predetermined delay period to expire, the conference connection unit 302 could monitor the audio on the call to determine when the conference call bridge has finished asking the caller to input an access code. In yet another alternate embodiment, speech recognition assets could be employed to determine exactly what the conference call bridge asks for, and once the request is finished, the data provision unit 314 would provide the requested information.

The conference connection unit 302 could store profile information for various different commonly used conference systems. The profile information would indicate the way in which the conference system operates and how it requests information from a user. The telephone number that is used to access a conference system will likely give an indication of when a particular conference system is being called, as certain telephone numbers will be associated with a particular conference system. If the identity of the conference system can be determined before a telephone call is placed to access the conference system, the profile information corresponding to the conference system could be used to guide the conference connection unit 302 in accessing a conference call.

Figure 7:
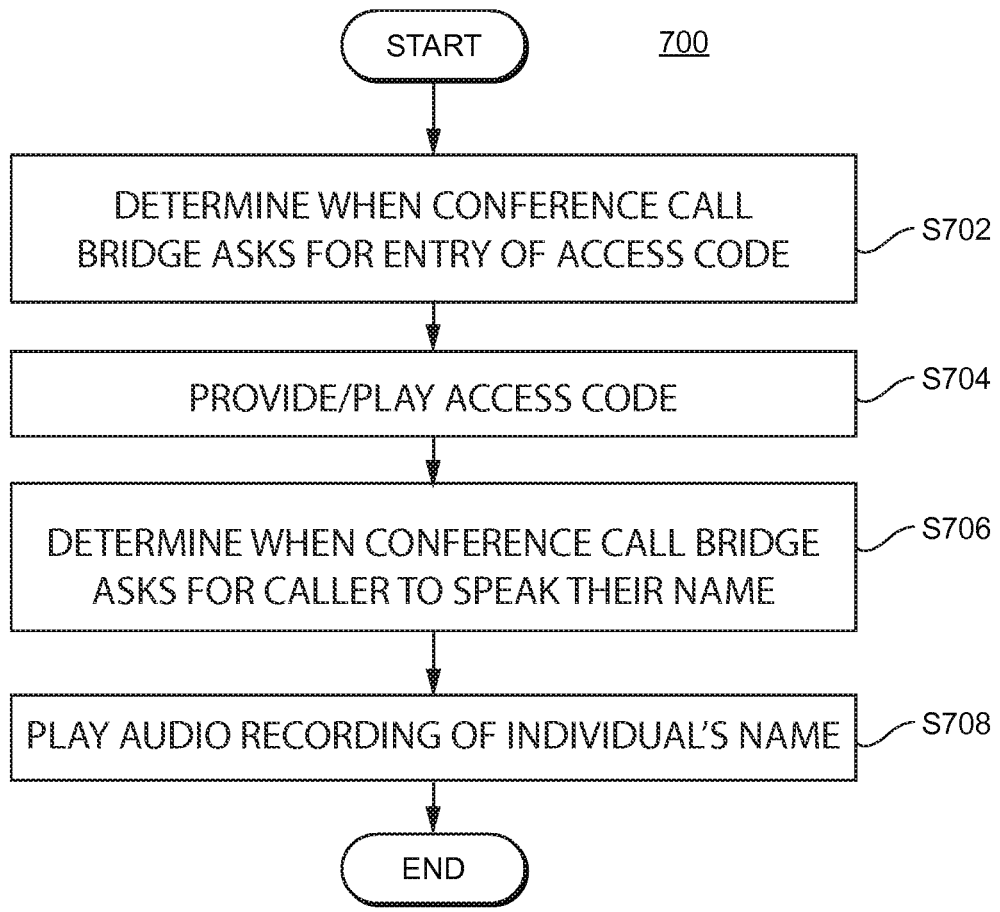
FIG. 7 is a flow diagram illustrating steps of a second method performed by elements of an IP telephony system to access a conference call using information obtained from an individual's electronic calendar.

FIG. 7 illustrates yet another method for accomplishing step S508 of the method illustrated in FIG. 5. This method 700 would begin after the conference connection unit 302 has placed a call to the conference system 402 to establish the second communications channel B, and after the conference call bridge has answered the call. During this method, the conference call bridge asks for an access code, and then also asks the caller to speak their name. Some conference call bridges operate in this fashion, and take a recording of whatever the caller says after they are asked for their name. This recording is then played to other people that are already on the conference call as part of an announcement that indicates a new caller is joining the conference call.

The method proceeds to step S702 where the data provision unit 314 determines when the conference call bridge has asked for entry of an access code. In step S704, the data provision unit 314 provides the access code to the conference call bridge. Next, in step S706, the data provision unit 314 determines when the conference call bridge asks the caller to speak their name. As noted above, speech recognition assets could be used to make this determination. Alternatively, if a particular conference call bridge routinely asks for this information after the access code has been input, step S706 could simply involve monitoring the audio to determine when the conference call bridge has finished asking the caller to speak their name. In still other embodiments, step S706 could involve waiting for a predetermined delay period to expire after the access code has been input.

In step S708, the data provision unit 314 plays an audio recording of the user's name to the conference call bridge. The audio recording could be one that the individual has provided during a configuration process. Alternately, the data provision unit 314 could generate the audio of the individual's name. The method would then end, which essentially means proceeding to step S510 of the method illustrated in FIG. 5.

Returning now to a discussion of the method illustrated in FIG. 5, once the first and second communications channels have been established, and login to the conference call has been accomplished, the method proceeds to step S510, where the bridging unit 316 bridges the first communications channel A and the second communications channel B to establish a communications channel between the first individual's IP telephony device 406 and the conference call being hosted by the conference system 402. The method then ends.

As mentioned above, an individual's preferences may specify that if the individual fails to answer a call placed to one of the individual's telephony devices during step S504 of the method in FIG. 5, the communication channel establishment unit 312 is to make a second attempt to reach the individual via one of the individual's other telephony devices. For example, if the call placed to the first individual's IP telephony device 406 was not answered, step S504 could further include making a second telephone call to the first individual's cellular telephone 408.

If the communications channel establishment unit 312 is unable to setup a first communications channel to one of the individual's telephony devices, the method would end without the need to perform any of the steps for setting up the second communications channel or logging into the conference call. Similarly, when the communications channel establishment unit 312 attempts to setup the first communications channel, the individual may be asked if the individual wishes to be connected to the conference call. If the individual responds in a negative fashion, the method would end without the need to perform any of the steps for setting up the second communications channel or logging into the conference call.

Also, as part of the step of setting up the first communications channel, the communications channel establishment unit 312 may play a recording to the individual. The recording could include information about the conference call to which the individual is being connected, and that information could be drawn from the individual's electronic calendar as well. The information could include the topic of the conference call, the identity of the organizer, the identity of other participants, and other information. This information could be played to the individual using text-to-speech functionality.

In the method described above, we assumed that once the second communications channel had been established between the conference connection unit 302 and the conference call bridge, that the data provision unit 314 is able to successfully access the conference call by providing the required information. However, if the data provision unit 314 experiences difficulty in accessing the conference call, the method could nevertheless proceed to step S510, where the first and second communications channels are bridged. At that point, the individual would be connected to the conference call bridge, and the individual could intervene and provide whatever information is required to access the conference call. If this sequence of events occurs, the conference connection unit might also play a recording to the individual to alert the individual to the fact that it has been unsuccessful in accessing the conference call, and to inform the individual that he may need to provide additional information to access the conference call.

In the foregoing description, the first communications channel between the conference connection unit 302 and the individual's telephony device is setup before the second communications channel between the conference connection unit 302 and the conference system is setup. In alternate embodiments, the communications channels could be setup simultaneously, or the communications channel to the conference system could be setup before the communications channel to the individual's telephony device is setup.

Figure 8:
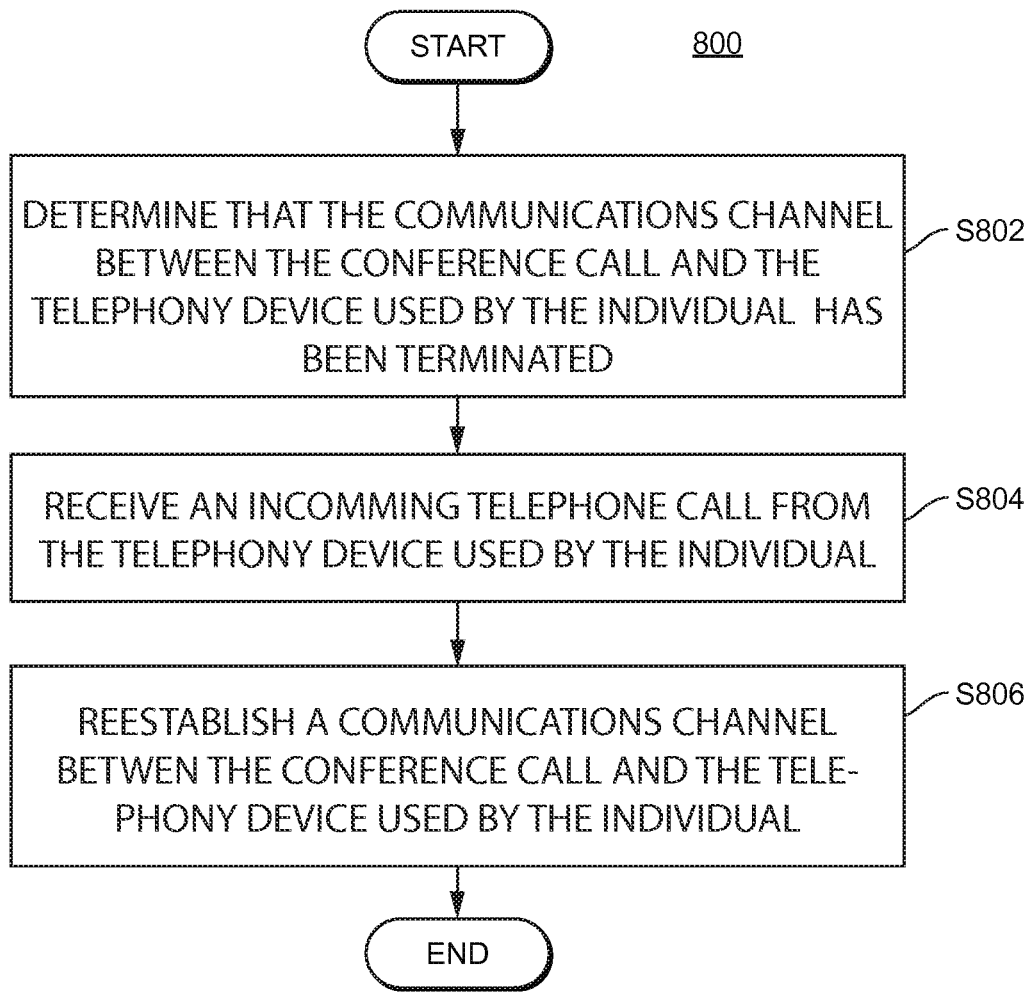
FIG. 8 is a flow diagram illustrating steps of a method of reconnecting an individual to a conference call if the individual is prematurely disconnected from the conference call.

FIG. 8 illustrates steps of a method that could be performed to handle a common problem encountered by conference call participants, which is being prematurely disconnected from the conference call. This could happen for a variety of reasons. It commonly occurs when the participant is using a mobile telephone to participate in a conference call, and the mobile telephone temporarily loses its signal.

The method illustrated in FIG. 8 is performed by the conference connection unit 302 when an individual that has previously been connected to a conference call by the conference connection unit 302 is prematurely disconnected from the conference call while the conference call is ongoing. The method 800 begins and proceeds to step S802, where the communication channel setup unit 310 determines that the communications channel between the conference call and the telephony device used by the individual has been terminated. This determination could be made in a variety of ways, as would be known to those of ordinary skill in the art. For example, the communication channel setup unit 310 could note when a communications channel between an individual's telephony device and a conference call system has become disconnected.

The individual who was participating in the conference call would cause their telephony device to place an outgoing telephone call to the telephone number from which the last incoming call was received. This will be the telephone number of a telephone line used by the communication channel setup unit 310 to setup the first communications channel between the IP telephony system 120 and the individual's telephony device. In the method illustrated in FIG. 8, in step S804, the communication channel setup unit 310 receives that incoming telephone call from the individual's telephony device. Step S804 might also include the communications channel setup unit 310 determining that the incoming telephone call is from the telephony device used by the individual. This determination could be made using caller ID information associated with the incoming telephone call.

In step S806, the communication channel setup unit 310 acts to reestablish a communications channel between the conference call and the telephony device used by the individual. This could include setting up a new communications channel between the IP telephony system and the conference call bridge, and providing the access code and any other information required to log into the conference call a second time. This could also include bridging the new communications channel between the IP telephony system and the conference call with the incoming call received from the telephony device used by the individual.

In some embodiments, when the communications channel setup unit 310 receives the incoming telephone call from the telephony device used by the individual, a check is performed to determine if the current time is within the time window that was scheduled for the conference call. In this embodiment, only if the current time is within this window would the communication channel setup unit 310 act to reestablish a communications channel between the conference call and the telephony device used by the individual.

Some of the foregoing descriptions discussed the invention in terms of an audio conference call. In alternate embodiments of the invention, the claimed systems and methods could be used to automatically connect an individual to a video conference. In such alternate embodiments, instead of placing an outgoing telephone call to a conference call bridge, the system could establish a communications channel to a video conference calling system. Thus, any references in the foregoing description and the following claims to an access telephone number are to be interpreted as also encompassing an access Internet IP address and/or an access Internet URL. Likewise, any references to a conference call are to be interpreted as encompassing both audio and video conference calls. Any references to establishing a communications channel are to be interpreted as encompassing establishing an audio communications channel via one or more telephony systems, as well as establishing a video communications channel via telephony and/or computer or data networks.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the invention should in no way be considered limiting. Systems and methods embodying the invention could also be implemented as part of an alternate type of telephony system.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for connecting a user's telephony device to a conference call, comprising:

obtaining, using one or more processors, information about a scheduled conference call from an individual's electronic calendar, wherein the information includes at least an access identifier that is to be used to access the conference call;

setting up a communications channel between the conference call and a telephony device used by the individual at a time that is based upon a start time of the scheduled conference call, wherein setting up the communications channel comprises:

monitoring, with at least one processor, audio on the communications channel, and using speech recognition techniques to determine when a conference call bridge for the conference call has asked for a participant to speak their name; and playing an audio recording to the conference call bridge after it is determined that the conference call bridge has asked for a participant to speak their name.

2. The method of claim 1, wherein setting up a communications channel between the conference call and a telephony device used by the individual comprises:

setting up a first communications channel between the telephony system and the telephony device used by the individual; and setting up a second communications channel between a telephony system and a conference call bridge for the scheduled conference call using the access identifier;

bridging together the first and second communications channels to create the communications channel between the conference call and the telephony device used by the individual.

3. The method of claim 2, wherein obtaining information about the scheduled conference call further comprises obtaining an access code that is to be used to access the conference call bridge from the individual's electronic calendar, and wherein setting up the communications channel between the conference call and the telephony device used by the individual also comprises automatically providing the access code to the conference call bridge.

4. The method of claim 3, wherein automatically providing the access code to the conference call bridge comprises providing the access code to the conference call bridge once a predetermined period of time has expired after the second communications channel has been established between the telephony system and the conference call bridge.

5. The method of claim 3, wherein automatically providing the access code to the conference call bridge comprises:

monitoring, with at least one processor, audio on the communications channel, and using speech recognition techniques to determine when the conference call bridge has asked for the access code; and providing the access code to the conference call bridge after it is determined that the conference call bridge has asked for the access code.

6. The method of claim 3, wherein the step of bridging together the first and second communications channels is performed after the access code has been provided to the conference call bridge.

7. The method of claim 2, wherein the step of bridging together the first and second communications channels is performed after the audio recording has been played to the conference call bridge.

8. The method of claim 2, further comprising:

determining that the communications channel between conference call and the telephony device used by the individual has been terminated;

receiving an incoming telephone call from the telephony device used by the individual; and reestablishing a communications channel between the conference call and the telephony device used by the individual.

9. The method of claim 8, wherein reestablishing the communications channel between the conference call and the telephony device used by the individual comprises:

determining whether the received incoming telephone call is from the telephony device used by the individual using caller ID information associated with the incoming telephone call; and reestablishing the communications channel between the conference call and the telephony device used by the individual when it is determined that the received incoming telephone call is from the telephony device used by the individual.

10. The method of claim 8, wherein reestablishing the communications channel between the conference call and the telephony device used by the individual comprises:

setting up a new communications channel between the telephony system and the conference call bridge using the access identifier; and bridging together the received telephone call from the telephony device used by the individual and the new communications channel to reestablish a communications channel between the conference call and the telephony device used by the individual.

11. The method of claim 2, wherein setting up a second communications channel between a telephony system and a conference call bridge comprises:

determining an identity the conference call bridge service provider; and responding to questions posed by the conference call bridge based on profile information for the determined conference call bridge service provider.

12. The method of claim 2, wherein setting up a first communications channel between the telephony system and the telephony device used by the individual comprises causing information related to the conference call to be played to the individual via the telephony device used by the individual.

13. The method of claim 2, wherein setting up a first communications channel between the telephony system and the telephony device used by the individual comprises using profile information related to the individual to determine how to setup the communications channel between the telephony system and the telephony device used by the individual.

14. The method of claim 1, wherein obtaining information about a scheduled conference call comprises receiving a communication that includes information about the conference call.

15. The method of claim 1, wherein obtaining information about a scheduled conference call comprises:

obtaining authorization from the individual to access information in the individual's electronic calendar; and periodically accessing the individual's electronic calendar to obtain information about one or more scheduled conference calls that is present in the individual's electronic calendar.

16. The method of claim 15, wherein periodically accessing the individual's electronic calendar to obtain information about one or more scheduled conference calls comprises identifying information in the individual's electronic calendar that conforms to a predetermined format that is used to store information about scheduled conference calls.

17. A system for connecting a user's telephony device to a conference call, comprising:

means for obtaining, using one or more processors, information about a scheduled conference call from an individual's electronic calendar, wherein the information includes at least an access identifier that is to be used to access the conference call; and means for setting up a communications channel between the conference call and a telephony device used by the individual at a time that is based upon a start time of the scheduled conference call, wherein the means for setting up a communications channel:

monitors, with at least one processor, audio on the communications channel, and uses speech recognition techniques to determine when a conference call bridge for the conference call has asked for a participant to speak their name; and plays an audio recording to the conference call bridge after it is determined that the conference call bridge has asked for a participant to speak their name.

18. A system for connecting a user's telephony device to a conference call, comprising:

an electronic calendar interface that obtains, using one or more processors, information about a scheduled conference call from an individual's electronic calendar, wherein the information includes at least an access identifier that is to be used to access the conference call; and a communication channel setup unit that sets up a communications channel between the conference call and a telephony device used by the individual at a time that is based upon a start time of the scheduled conference call, wherein the communication channel setup unit:

monitors, with at least one processor, audio on the communications channel, and using speech recognition techniques to determine when a conference call bridge for the conference call has asked for a participant to speak their name; and plays an audio recording to the conference call bridge after it is determined that the conference call bridge has asked for a participant to speak their name.

19. The system of claim 18, wherein the communication channel setup unit is part of a telephony system, and wherein the communication channel setup unit of the telephony system sets up a communications channel between the conference call and the telephony device by:

setting up a first communications channel between the telephony system and the telephony device used by the individual;

setting up a second communications channel between a telephony system and a conference call bridge for the scheduled conference call using the access identifier; and bridging together the first and second communications channels to create the communications channel between the conference call and the telephony device used by the individual.

20. The system of claim 19, wherein the communication channel setup unit bridges together the first and second communications channels after the audio recording has been played to the conference call bridge.

* * * * *